United States Patent [19]
Kindler

[11] Patent Number: 4,561,068
[45] Date of Patent: Dec. 24, 1985

[54] ARRANGEMENT FOR THE SUPPRESSION OF SIGNAL INTERFERENCE

[75] Inventor: Ulrich Kindler, Hamburg, Fed. Rep. of Germany

[73] Assignee: U.S. Philips Corporation, New York, N.Y.

[21] Appl. No.: 510,057

[22] Filed: Jul. 1, 1983

[30] Foreign Application Priority Data

Jul. 2, 1982 [DE] Fed. Rep. of Germany ....... 3224768

[51] Int. Cl.⁴ .............................................. G06G 7/00
[52] U.S. Cl. .................................. 364/825; 364/819; 371/68
[58] Field of Search ............... 364/807, 825, 861, 604, 364/724, 728, 819; 371/67–68, 72; 340/825, 825.01, 825.03, 825.06, 825.16; 375/37–38; 370/83

[56] References Cited

U.S. PATENT DOCUMENTS

| | | | |
|---|---|---|---|
| 3,409,875 | 11/1968 | Jager et al. | 371/68 X |
| 3,424,899 | 1/1969 | Dunnican et al. | 364/807 X |
| 3,631,490 | 12/1971 | Palmieri | 364/825 X |
| 3,828,130 | 8/1974 | Yamaguchi | 375/38 X |
| 4,117,540 | 9/1978 | Bonnemay | 364/807 X |
| 4,264,893 | 4/1981 | Hutch | 340/825.01 X |
| 4,357,700 | 11/1982 | Alvarez, III et al. | 370/83 |
| 4,447,903 | 5/1984 | Sewerinson | 371/68 |

FOREIGN PATENT DOCUMENTS 2089621A  6/1982  United Kingdom ................. 371/68

Primary Examiner—Gary V. Harkcom
Attorney, Agent, or Firm—Robert T. Mayer; Bernard Franzblau

[57] ABSTRACT

An arrangement for the suppression of signal interference removes the interference components from the useful signals, which interference components are additively superimposed on the useful signals during transmission via two electrical lines 2, 3. The two transmission lines couple an electric signal source 4 to a processing circuit 1. The transmission lines 2, 3 have different sensitivities to interference signals, i.e. only the line 2 includes a shield 5 against interference signals 6. The processing circuit includes correlation networks, subtraction circuits and dividers which operate on the signals from the two lines to derive an interference-free useful signal at the output of the processing circuit.

10 Claims, 3 Drawing Figures

ARRANGEMENT FOR THE SUPPRESSION OF SIGNAL INTERFERENCE

BACKGROUND OF THE INVENTION

This invention relates to an arrangement for the suppression of signal interference, which arrangement comprises two transmission networks which electrically connect an electric signal source to a processing circuit for computing the interference-free useful signal.

Measuring quantities which are detected and converted into a transmissible electrical quantity by electronic sensors are susceptible to the influence of interference during the transmission from the measurement location to the processing and display circuit. In order to process the information contained in the useful signals the useful signals must be freed of interference.

Correlation methods for the elimination of spurious components are described in the book by G. Ehrenstrasser, "Stochastische Signale und ihre Anwendung" from Dr. A. Hüthig Verlag, Heidelberg, pages 82 to 84. These methods are employed for the detection of signals with a very high noise level. The useful signals which appear simultaneously across two measurement sensors are transferred via two measuring channels which are influenced by interference independently of each other. At the end of the transmission path these measuring channels are connected to a cross-correlator which generates the cross-correlation function for the delay time $\tau = 0$ from the two disturbed signals transmitted by the two channels. The correlator computes the square of the effective values of the useful signals because only the identical useful signals are correlated to each other. Since neither the interference signals and useful signals nor the interference signals of both channels are statistically related to each other all further products of the effective values of the useful signal and the interference signals and of the two interference signals computed by the correlator are zero. However, if the interference signals which influence the two measuring channels are not statistically independent of each other, as for example in the case of electromagnetic interference influencing the transmission lines, the correlator will compute a non-zero product for the effective values of the interference signals superimposed on the square of the effective values of the useful signals at the output of the correlator. Thus, the known correlation method is not capable of removing those spurious signals from the useful signal which act over a larger area and thus may influence several component parts at the same time.

SUMMARY OF THE INVENTION

It is an object of the present invention to provide a processing circuit for the suppression of interference on non-periodic unknown useful signals, on which unknown non-periodic interference signals are superimposed additively, which interference signals have the same frequency spectrum as the useful signals and influence more than one component part at the same time.

According to the invention this object is achieved in that the transmission networks have different sensitivities to interference signals and the processing circuit derives the useful signals from the various signals at the inputs of the processing circuit by computation and elimination of the interference signals which influence a transmission network.

The versions of the processing circuit described in the subclaims can be constructed simply by means of commercially available adding circuts, subtracting circuits, dividers, multipliers and averagers.

BRIEF DESCRIPTION OF THE DRAWINGS

Some embodiments of the invention will now be described in more detail, by way of example, with reference to the drawings. In the drawings.

DESCRIPTION OF THE PREFERRED EMBODIMENTS

Figure 1:
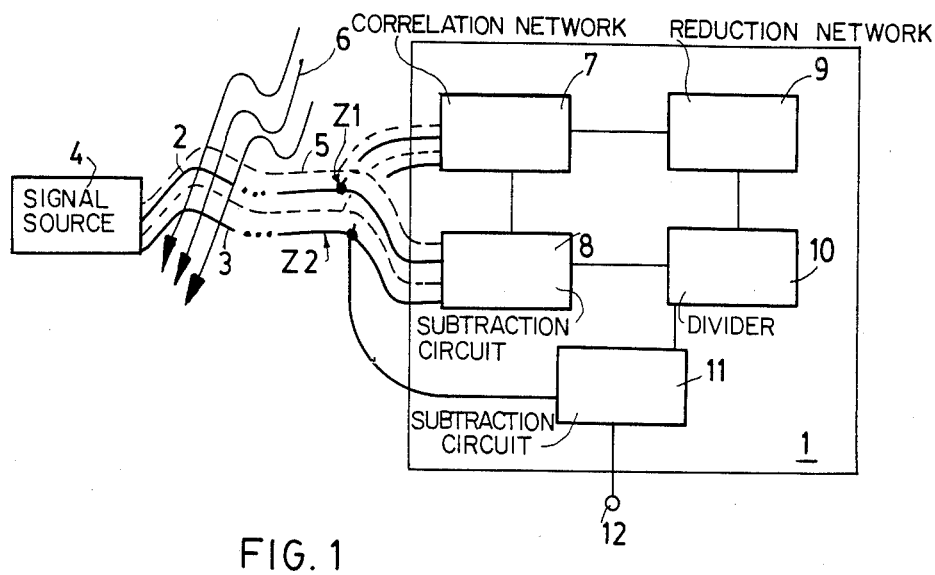
FIG. 1 is a block diagram of the processing circuit which is connected to an electrical signal source via a plurality of transmission lines.

In FIG. 1 the processing circuit 1 is connected to an electrical signal source 4 via two transmission lines 2 and 3. The electrical signal source 4 is, for example, a pressure transducer which determines the pressure of a gas or liquid and converts it into an electric signal by means of strain gages. The transmission lines 2 and 3 are shielded from interference signals 6 in different ways. The transmission line 2, for example, is shielded against electromagnetic interference signals 6 by means of braided wire 5, indicated by a dashed line, whereas the transmission line 3 is not shielded or is shielded differently.

The processing circuit 1 comprises a correlation network 7 which is connected to the transmission lines 2 and 3, an input subtracting circuit 8, a reduction network 9, a divider 10 and an output subtracting circuit 11, which are connected to each other and to the transmission lines 2 and 3 in the manner shown. The components 8–11 are available from Analog Devices, Inc. Subtractng circuit 8 may be an AD 532, reduction network 9 an AD 504, divider 10 an AD 535 and subtracting circuit 11 an AD 504. The useful signal from which interference signals 6 have been removed is available at the terminal 12 of the processing circuit 1.

If the electromagnetic interference signal 6 influences the transmission lines 2 and 3, the interference signal $Z_1$ which is attenuated by the shielding 5 is additively superimposed on the useful signal transmitted via the transmission line 2 and the unattenuated interference signal $Z_1$ is additively superimposed on the identical useful signal transmitted via the transmission line 3. The transmission line 2 provides a composite signal $X + Z_1$ and the transmission line 3 provides a composite signal $X + Z_2$, where X is the useful signal component. The input subtracting circuit 8 subtracts the composite signals, which have equal useful signal components, from each other and supplies the difference of the interference signals $(Z_1 - Z_2)$ thus obtained to the correlation network 7, which computes the ratio of the interference signals $Z_1/Z_2$ from this difference and the composite (disturbed) signals. The reduction network 9 subtracts the value 1 from the ratio of the interference signals $Z_1/Z_2$, so that the divider 10 can calculate the interference signal $Z_2$ from the difference between the interference signals $(Z_1 - Z_2)$ supplied by the input subtracting circuit 8 and the interference signal ratio minus 1 $(Z_1/Z_2 - 1)$ supplied by the reduction network 9 in accordance with the relationship $Z_2 = (Z_1 - Z_2)/(Z_1/Z_2) - 1)$.

The output subtracting circuit 11 subtracts the interference signal $Z_2$ computed by the divider 10 from the useful signal which is transmitted via the transmission line 3 and which contains an interference component $Z_2$, and thus supplies an undisturbed useful signal at the electrical terminal 12.

Figure 2:
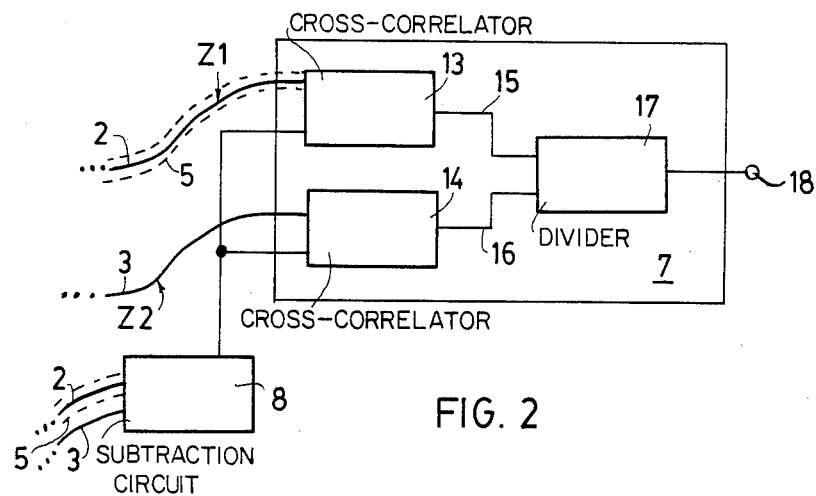
FIG. 2 and FIG. 3 are the block diagrams of two versions of the correlation network.

A version of a correlation network 7 is shown in FIG. 2. A cross-correlator 13, e.g. an AD 532 from Analog Devices, Inc. followed by an RC low pass filter is connected to the transmission line 2 and to the input subtracting circuit 8. A further cross-correlator 14 (e.g. another AD 532 circuit and RC low pass filter) is connected to the transmission line 3 and also to the input subtracting circuit 8. Via two lines 15 and 16 the cross-correlators 13 and 14 are connected to a further divider 17, e.g. another AD 535. The divider 17 is connected to the output 18.

The cross-correlators 13 and 14 operate with the delay time $\tau=0$, which means that the cross-correlators 13 and 14 may comprise a simple mutliplier followed by a network for the formation of the time-average from the product calculated by the multiplier. Hereinafter, the useful signal is designated x. Via the transmission line 2 the cross-correlator 13 receives the signal $(x+Z_1)$ and from the input subtracting circuit 8 it receives the signal $(Z_1-Z_2)$. Via the transmission line 3 the cross-correlator 14 receives the signal $(x+Z_2)$ and from the input subtracting circuit 8 it receives the signal $(Z_1-Z_2)$. Subsequently, the two cross-correlators 13 and 14 form the products $(x+Z_1)\cdot(Z_1-Z_2)$ and $(x+Z_2)\cdot(Z_1-Z_2)$ from the applied signals. From these products the cross-correlators 13 and 14 form the time-averages for which the average values of the products $x\cdot Z_1$ and $x\cdot Z_2$ are zero, so that via the line 15 the cross-correlator 13 supplies the average value of $(Z_1^2-Z_1\cdot Z_2)$ to the divider 17 and via the line 16, the cross-correlator 14 supplies the average value of $(-Z_2^2+Z_1\cdot Z_2)$ to the divider 17, from which the divider 17 computes the ratio of the interference signals $Z_1/Z_2$ in accordance with the following relationship $$\frac{(Z_1^2 - Z_1 \cdot Z_2)}{(-Z_2^2 + Z_1 \cdot Z_2)} = \frac{Z_1(Z_1 - Z_2)}{Z_2(Z_1 - Z_2)} = \frac{Z_1}{Z_2}$$

which ratio is transferred to the input of the reduction network 9.

Figure 3:
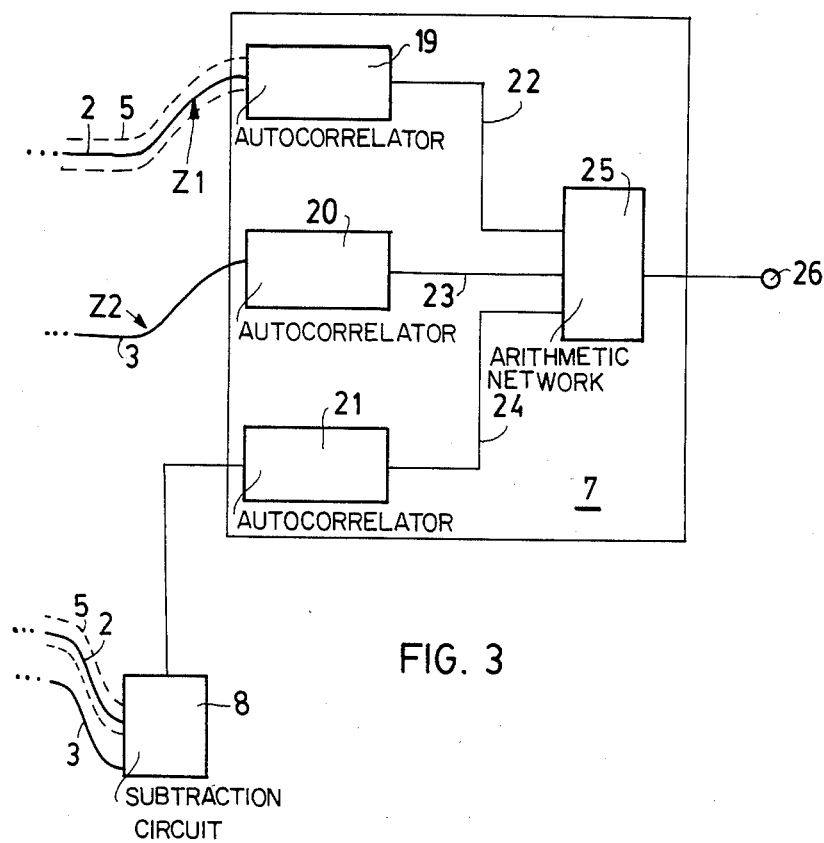

A further version of the correlation network 7 is shown in FIG. 3. Autocorrelators 19, 20 and 21 (e.g. each may be an AD 532 followed by an RC low pass filter) are connected to the transmission lines 2 and 3 and the input subtracting circuit 8 respectively. Via the lines 22, 23 and 24 the correlators 19, 20 and 21 are connected to an arithmetic network 25, at whose output 26 the interference-signal ratio $Z_1/Z_2$ is available.

The autocorrelators 19, 20 and 21 operate with the delay time $\tau=0$, so that they may comprise a squaring network followed by a network for forming the time averages. The signal $(x+Z_1)$ transmitted via the transmission line 2 is applied to the correlator 19. From this signal the autocorrelator 19 forms the time average $\Phi_1$ of $(x+Z_1)^2$. The signal $\Phi_1$ is applied to the arithmetic network 25 via the line 22. Via the transmission line 3 the autocorrelator 20 receives the disturbed useful signal $(x+Z_2)$ which contains the interference component $Z_2$ and derives the time average $\Phi_2$ of $(x+Z_2)^2$. The signal $\Phi_2$ is applied to the arithmetic network 25 via the line 23. The autocorrelator 21 is connected to the input subtracting circuit 8, which computes the difference between the interference signals $(Z_1-Z_2)$. Thus, the autocorrelator 21 computes the time average $\Phi_3$ from $(Z_1-Z_2)^2$ which is also applied to the arithmetic network 25 via the line 24.

In accordance with the formula $$\frac{Z_1}{Z_2} = \frac{\Phi_1 - \Phi_2 + \Phi_3}{\Phi_1 - \Phi_2 - \Phi_3} =$$

$$\frac{\overline{(x+Z_1)^2} - \overline{(x+Z_2)^2} + \overline{(Z_1-Z_2)^2}}{\overline{(z+Z_1)^2} - \overline{(x+Z_2)^2} - \overline{(Z_1-Z_2)^2}} =$$

$$\frac{Z_1^2 - Z_2^2 + (Z_1 - Z_2)^2}{Z_1^2 - Z_2^2 - (Z_1 - Z_2)^2},$$

for which the average values of the products $x\cdot Z_1$ and $x\cdot Z_2$ respectively yield zero, the arithmetic network 25, which comprises commercially available adder, subtractor and divider networks, computes the interference-signal ratio $Z_1/Z_2$. Arithmetic network 25 may comprise, for example, three AD 504 and one AD 535 arranged in accordance with the last formula for $Z_1/Z_2$. This signal is applied to the reduction network 9 for further processing.

What is claimed is:

1. An arrangement for the suppression of signal interference comprising: two transmission networks which electrically connect an electric signal source to a processing circuit, the transmission networks arranged to have different sensitivities to interference signals of unspecified characteristics, a processing ciruit for computing an interference-free useful signal from two composite signals supplied by the two transmission networks, the two transmission networks each providing a different response to a respective interference signal, the processing circuit including means for deriving the useful signal from the composite signals at the inputs of the processing circuit by computation and elimination of the interference signals which influence each transmission network.

2. An arrangement for the suppression of signal interference produced in two transmission networks which electrically connect an electric signal source to a processing circuit, the transmission networks having different sensitivities to interference signals, wherein the processing circuit comprises, an input subtracting circuit connected to the transmission networks formed by two transmission lines so as to supply the difference between the interference signals $(Z_1-Z_2)$ which influence the transmission lines to a correlation network connected to the transmission lines, said correlation network computing the interference-signal ratio $(Z_1/Z_2)$, a reduction network connected to the correlation network to derive a signal $(Z_1/Z_2)-1$, a divider connected to the reduction network and to the input subtracting circuit thereby to compute the interference signal $(Z_2)$ from the difference between the interference signals $(Z_1-Z_2)$, as the dividend, and the signal $(Z_1/Z_2)-1$ representing the interference-signal ratio minus 1, as the divisor, and an output subtracting circuit connected to the divider and to the transmission line which is influenced by $Z_2$ thereby to compute an undisturbed useful signal by subtracting the interference signal $Z_2$ from the disturbed signal having the interference component $Z_2$.

3. An arrangement as claimed in claim 2, wherein the correlation network comprises two cross-correlators connected to the input subtracting circuit and to a respective one of said two transmission lines and which operate with a delay time $\tau = 0$, a further divider coupled to said two cross-correlators for computing the interference-signal ratio $(Z_1/Z_2)$ from output quantities supplied by said correlators.

4. An arrangement as claimed in claim 2, wherein the correlation network comprises two auto-correlators connected to a respective one of said two transmission lines and one auto-correlator connected to the input subtracting circuit, said correlators operating with a delay time $\tau = 0$, an arithmetic network coupled to said auto-correlators for computing the interference-signal ratio $(Z_1/Z_2)$ from output quantities supplied by said correlators in accordance with the relationship $$\frac{Z_1}{Z_2} = \frac{\Phi_1 - \Phi_2 + \Phi_3}{\Phi_1 - \Phi_2 - \Phi_3}$$

wherein
$\Phi_1$ is the output quantity of the autocorrelator connected to the transmission line which is influenced by the interference signal $(Z_1)$
$\Phi_2$ is the output quantity of the autocorrelator which is connected to the transmission line which is influenced by the interference signal $(Z_2)$, and
$\Phi_3$ is the output quantity of the autocorrelator which is connected to the input subtracting circuit.

5. In an apparatus for suppressing signal interference received via first and second transmission networks which couple an electric signal source at a first location to a signal processing circuit at a second location remote from the first location, said first and second transmission networks supplying, in addition to a useful signal, first and second interference signals $Z_1$ and $Z_2$, respectively, wherein $Z_1 \neq Z_2$, a processing circuit comprising:
a subtracting circuit having input means coupled to said first and second networks and having first and second outputs for supplying signals equal to the difference of the interference signals $(Z_1 - Z_2)$,
a correlation network having a first input coupled to the first output of the subtracting circuit and a second input coupled to said first and second networks, said correlation network being operative to derive an interference-signal ratio $(Z_1/Z_2)$ at an output thereof,
a reduction network coupled to the output of the correlation network to supply at its output a signal $(Z_1/Z_2) - 1$,
a divider network having first and second inputs coupled to the output of the reduction network and the second output of the subtracting circuit, respectively, and operative to derive at its output a signal $(Z_1 - Z_2)/((Z_1/Z_2) - 1)$, and
a second subtracting circuit having a first input coupled to the output of the divider network and a second input coupled to the second transmission network thereby to derive at an output terminal thereof a signal comprising the useful signal from the electric signal source relatively free of said interference signals of the transmission networks.

6. A circuit for processing a useful signal (X) transmitted over first and second transmission networks arranged to have different sensitivities to interference signals and in a manner so as to suppress interference signals $Z_1$ and $Z_2$ produced in the first and second transmission networks, respectively, the processing circuit comprising: a subtraction circuit for subtracting the composite signals $X + Z_1$ and $X + Z_2$ received from the first and second transmission networks, respectively, to derive a difference quantity $(Z_1 - Z_2)$ which is the difference between the interference signals $Z_1$ and $Z_2$ on the first and second transmission networks, respectively, means responsive to said difference quantity and including at least a correlation network for deriving an electric quantity determined by the interference signal received from one of said transmission networks, and means for combining said electric quantity with the composite signal from said one transmission network so as to produce a useful output signal (X) substantially free of the interference signal.

7. A processing circuit as claimed in claim 6 wherein said derived electric quantity is determined by the interference signal $Z_2$ on the second transmission network and said one transmission network is the second transmission network with one composite signal $X + Z_2$, and wherein said combining means comprises a second subtraction circuit which subtracts an electric quantity signal $Z_2$ from the composite signal $X + Z_2$ to produce said useful output signal X.

8. A processing circuit as claimed in claim 6 wherein said electric quantity deriving means comprises, a correlation network having input means coupled to said first and second transmission networks and an input coupled to an output of the subtraction circuit to derive a first intermediate signal equal to the interference signal ratio $(Z_1/Z_2)$, a reduction network coupled to the correlation network to derive a second intermediate signal $(Z_1/Z_2) - 1$, a divider having input means coupled to the reduction network and to the subtraction circuit to produce said electric quantity equal to interference signal $Z_2$ by dividing the difference quantity $(Z_1 - Z_2)$ by the second intermediate signal $(Z_1/Z_2) - 1$, and a second subtraction circuit having input means coupled to the divider output and the second transmission network to produce said interference-free useful output signal (X) at an output of the second subtraction circuit.

9. A processing circuit as claimed in claim 8 wherein the correlation network comprises first and second cross-correlator devices each having an input connected to the first subtraction circuit and a second input connected to a respective one of the first and second transmission networks, each cross-correlator device operating with a delay time $\tau = 0$, and a further divider having input means coupled to said first and second cross-correlator devices for deriving said first intermediate signal $(Z_1/Z_2)$.

10. A processing circuit as claimed in claim 8 wherein the correlation network comprises first, second and third auto-correlator devices coupled to the first transmission network, the second transmission network and the output of the first subtraction circuit, respectively, each of the auto-correlator devices operating with a delay time $\tau = 0$, and an arithmetic network having input means coupled to outputs of said first, second, and third auto-correlator devices and means for deriving the first intermediate signal $(Z_1/Z_2)$ at an output thereof.

* * * * *

UNITED STATES PATENT AND TRADEMARK OFFICE
CERTIFICATE OF CORRECTION

PATENT NO. : 4,561,068

DATED : December 24, 1985

INVENTOR(S) : ULRICH KINDLER

It is certified that error appears in the above-identified patent and that said Letters Patent is hereby corrected as shown below:

In the ABSTRACT, LINE 5, after "electrical" insert

--transmission--.

In The Claims:

Claim 7, line 5, change "one" to --the--.

Signed and Sealed this

Thirteenth Day of January, 1987

*Attest:*

DONALD J. QUIGG

*Attesting Officer*  *Commissioner of Patents and Trademarks*